US012603435B2

(12) United States Patent
Lai et al.

(10) Patent No.: US 12,603,435 B2
(45) Date of Patent: Apr. 14, 2026

(54) ANTENNA STRUCTURE

(71) Applicant: Wistron NeWeb Corporation, Hsinchu (TW)

(72) Inventors: Kuo Jen Lai, Hsinchu (TW); Chin-Lien Huang, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 447 days.

(21) Appl. No.: 18/061,010

(22) Filed: Dec. 2, 2022

(65) Prior Publication Data

US 2024/0014560 A1 Jan. 11, 2024

(30) Foreign Application Priority Data

Jul. 6, 2022 (TW) .................................. 111125410

(51) Int. Cl.
*H01Q 9/04* (2006.01)
*H01Q 21/28* (2006.01)

(52) U.S. Cl.
CPC ........... *H01Q 9/0421* (2013.01); *H01Q 21/28* (2013.01)

(58) Field of Classification Search
CPC ........ H01Q 9/0421; H01Q 21/28; H01Q 9/04; H01Q 9/0407; H01Q 9/0442
See application file for complete search history.

(56) References Cited

U.S. PATENT DOCUMENTS

| | | | | |
|---|---|---|---|---|
| 11,145,990 | B2 | 10/2021 | Tseng et al. | |
| 2009/0009401 | A1 * | 1/2009 | Suzuki | H01Q 21/28 343/700 MS |
| 2016/0065260 | A1 * | 3/2016 | Heikura | H04B 1/3838 455/575.5 |
| 2016/0336643 | A1 * | 11/2016 | Pascolini | H01Q 9/0421 |
| 2019/0296446 | A1 * | 9/2019 | Tseng | H01Q 9/42 |

FOREIGN PATENT DOCUMENTS

| | | | | |
|---|---|---|---|---|
| CN | 112751155 B | * 4/2022 | | H01Q 13/10 |
| CN | 108565544 B | * 10/2023 | | H01Q 1/36 |
| TW | 201941493 A | 10/2019 | | |

* cited by examiner

*Primary Examiner* — Jimmy T Vu
(74) *Attorney, Agent, or Firm* — McClure, Qualey & Rodack, LLP

(57) ABSTRACT

The antenna structure includes a substrate, a ground layer, a feeding unit, an antenna unit, and an inductive element. The ground layer is disposed on the substrate. The feeding unit is disposed on the substrate. The antenna unit is disposed on the substrate and connected to the ground layer. The feeding unit and the antenna unit are indirectly connected. One end of the inductive element is electrically connected to the feeding unit, and another end of the inductive element is electrically connected to the antenna unit.

18 Claims, 6 Drawing Sheets

ANTENNA STRUCTURE

CROSS-REFERENCE TO RELATED PATENT APPLICATION

This application claims the benefit of priority to Taiwan Patent Application No. 111125410, filed on Jul. 6, 2022. The entire content of the above identified application is incorporated herein by reference.

BACKGROUND

Technical Field

The present disclosure relates to an antenna structure, and more particularly, to a small antenna structure.

Description of Related Art

The development of existing electronic devices like notebook computers, tablets, and mobile phones is in a trend of thin and light with more performance in limited space, and so the research and development of antenna components used in laptop computers is also focused on size reduction and performance enhancement. However, with the manufacturing cost in mind, reducing the size of electronic component may come with degraded performance.

From this, it can be seen that currently the market lacks an antenna structure that is small in size, with enhanced antenna bandwidth, and can be made without raising the manufacturing cost.

SUMMARY

It is an object of the present disclosure to provide an antenna structure that includes a substrate, a ground layer, a feeding unit, an antenna unit, and an inductive element. The ground layer is disposed on the substrate. The feeding unit is disposed on the substrate. The antenna unit is disposed on the substrate and connected to the ground layer. The antenna unit and the feeding unit are indirectly connected. One end of the inductive element is electrically connected to the feeding unit, and another end of the inductive element is electrically connected to the antenna unit.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
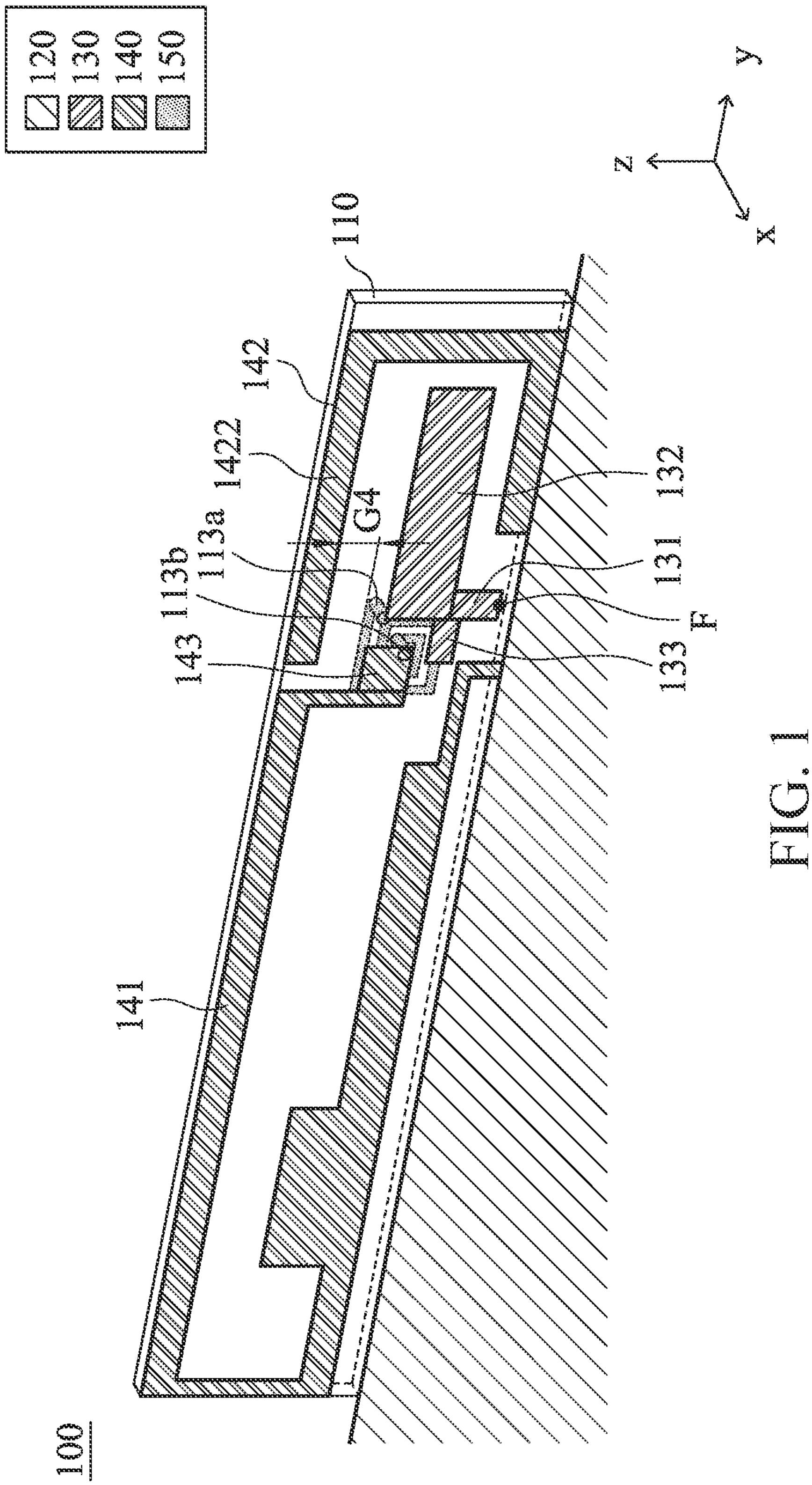
FIG. 1 is a schematic perspective view of an antenna structure according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 2:
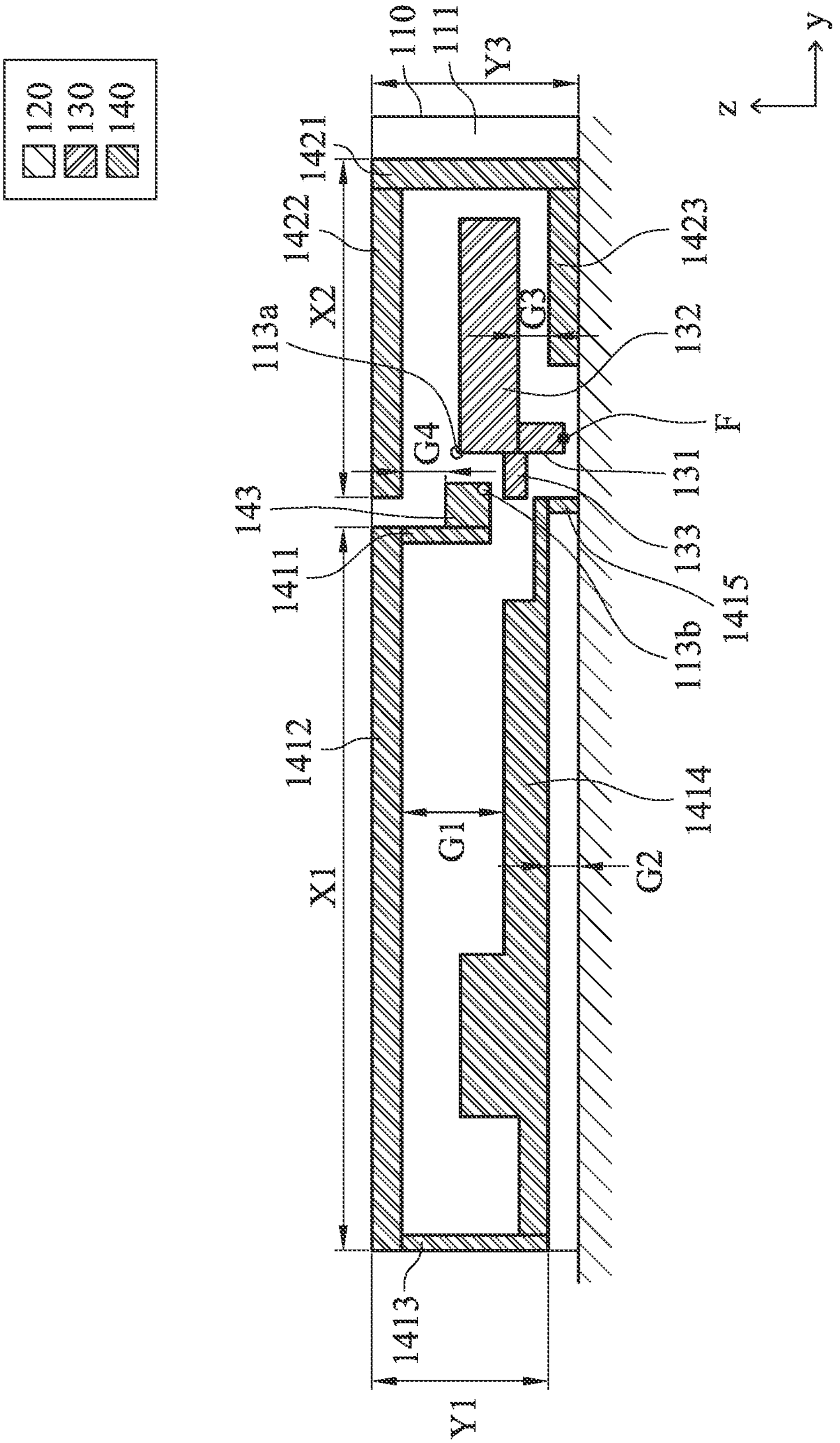
FIG. 2 is a schematic view of a first surface of the antenna structure shown in FIG. 1.
Figure 3:
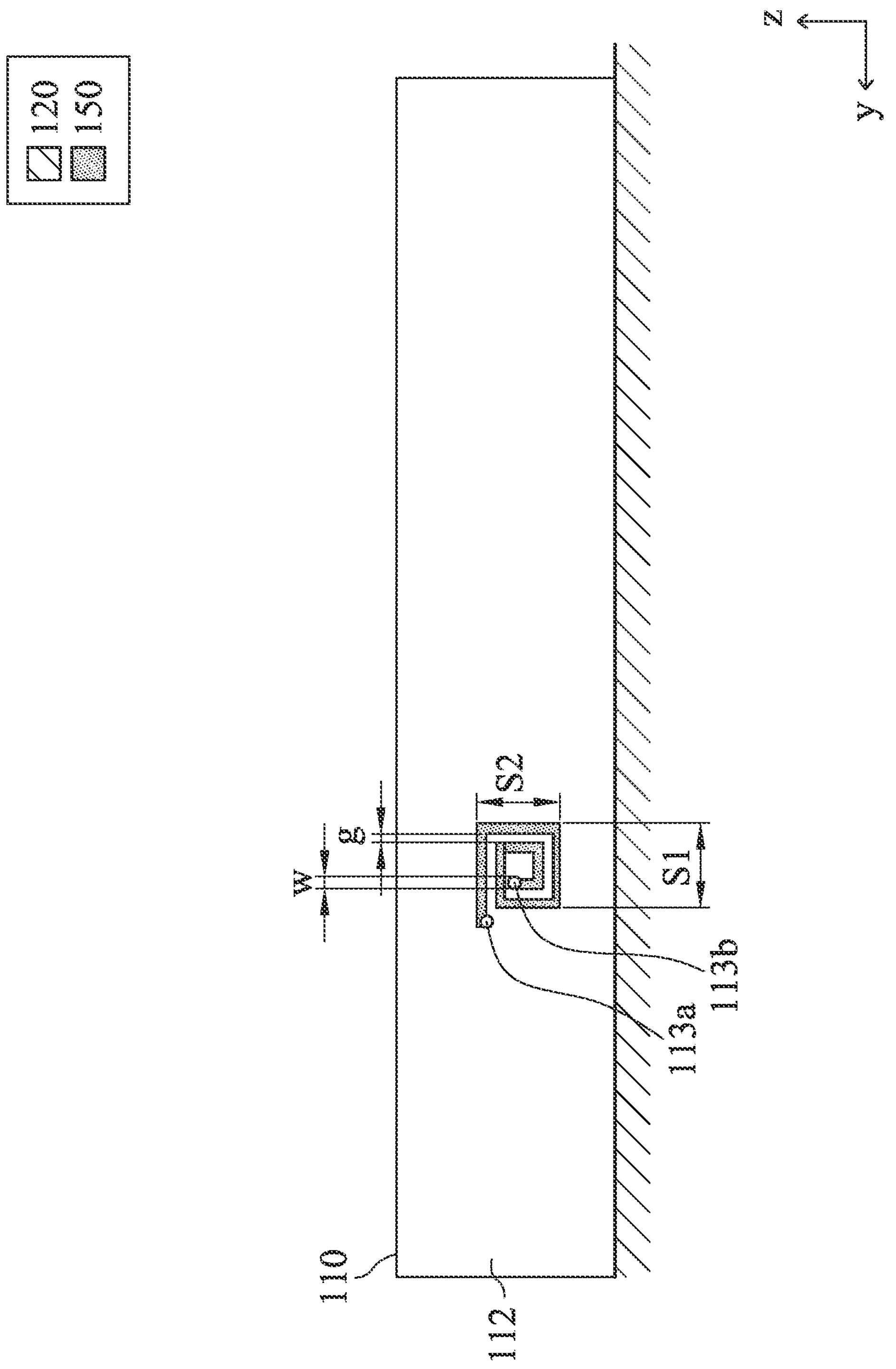
FIG. 3 is a schematic view of a second surface of the antenna structure shown in FIG. 1.

Referring to FIG. 1 to FIG. 3. FIG. 1 is a schematic perspective view of an antenna structure 100 according to an embodiment of the present disclosure. FIG. 2 is a schematic view of a first surface 111 of the antenna structure 100 shown in FIG. 1. FIG. 3 is a schematic view of a second surface 112 of the antenna structure 100 shown in FIG. 1. The antenna structure 100 includes a substrate 110, a ground layer 120, a feeding unit 130, an antenna unit 140, and an inductive element 150. The ground layer 120, the feeding unit 130, and the antenna unit 140 are disposed on the substrate 110. The antenna unit 140 is connected to the ground layer 120, and the feeding unit 130 and the antenna unit 140 are indirectly connected. One end of the inductive element 150 is electrically connected to the feeding unit 130, and another end of the inductive element 150 is electrically connected to the antenna unit 140. In other words, the antenna unit 140 and the feeding unit 130 are connected through the inductive element 150. As such, a range of the resonance band of the antenna structure 100 of the present disclosure is increased without the need for more space or an increase in volume.

More specifically, the substrate 110 has a first surface 111, a second surface 112, and two via holes 113*a*, 113*b*, and the first surface 111 and the second surface 112 are on opposite sides of the substrate 110. In this embodiment, the feeding unit 130, the antenna unit 140, and the ground layer 120 are disposed on the first surface 111, and the inductive element 150 is disposed on the second surface 112. The two via holes 113*a*, 113*b* penetrate through the substrate 110 along a direction x perpendicular to the first surface 111 and the second surface 112. One via hole 113*a* electrically connects one end of the inductive element 150 and the feeding unit 130, and the other via hole 113*b* electrically connects the another end of the inductive element 150 and the antenna unit 140. Thus, by arranging the ground layer 120, the feeding unit 130, the antenna unit 140, and the inductive element 150 on the first surface 111 and the second surface 112 of the substrate 110, where the feeding unit 130 and the antenna unit 140 are on the first surface 111 and the inductive element 150 is on the second surface 112, and with the via holes 113*a*, 113*b* acting as means for electrical connections, the antenna structure 100 of the present disclosure utilizes space efficiently so as to reduce the volume/size of the antenna structure 100.

In specific, the inductive element 150 is a coil, and the pattern of the coil can be as illustrated by the inductive element 150 in FIG. 3. The coil has a coil width w greater than or equal to 0.2 mm and less than or equal to 0.5 mm and a coil gap g (within the coil) greater than or equal to 0.2 mm and less than or equal to 0.5 mm. An equivalent inductance of the coil is greater than or equal to 4.2 nH and less than or equal to 8 nH. In this embodiment, the coil has a coil width w of mm, a coil gap g (within the coil) of 0.3 mm, an equivalent inductance of 7.9 nH, a length S1 along a second direction y of 3.3 mm, and a length S2 along a first direction z of 2.7 mm, but the present disclosure is not limited thereby. Hence, the antenna structure 100 of the present disclosure replaces the thicker and more complex physical inductor with the coil to be the inductive element 150 connecting the antenna unit 140 and the feeding unit 130 to minimize the size of the antenna structure 100 and simplify the circuit components. In other embodiments, the inductive element can be coil with circular shape or polygonal shape, and the present disclosure is not limited thereto.

Figure 4:
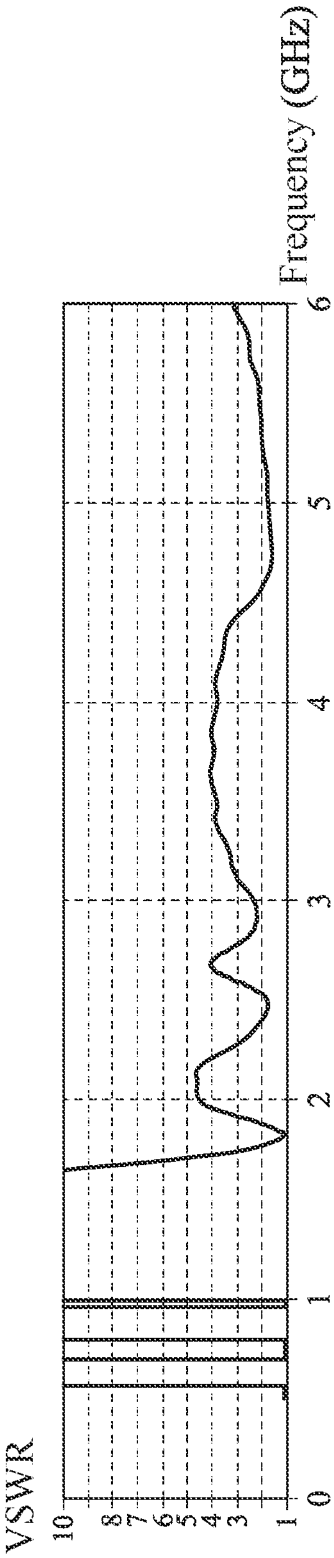
FIG. 4 is a voltage standing wave ratio (VSWR) graph of the antenna structure shown in FIG. 1.
Figure 5:
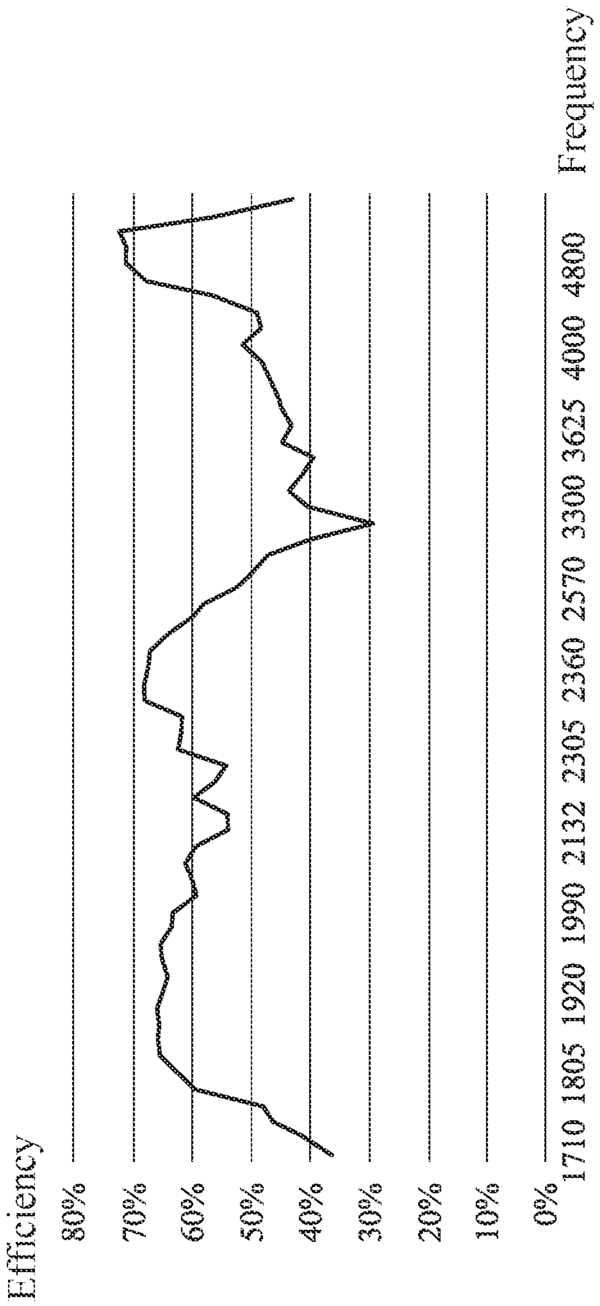
FIG. 5 is a schematic graph illustrating an efficiency of the antenna structure shown in FIG. 1.

Referring to FIG. 2 to FIG. 5. FIG. 4 is a VSWR graph of the antenna structure 100 shown in FIG. 1. FIG. 5 is a schematic graph illustrating an efficiency of the antenna structure 100 shown in FIG. 1. The antenna unit 140 can include a first band antenna 141 and a second band antenna 142. The first band antenna 141 is electrically connected to the another end of the inductive element 150. The second band antenna 142 and the first band antenna 141 are disposed at two sides of the feeding unit 130, respectively. A resonance frequency of the first band antenna 141 is 1.7 GHz, and a resonance frequency of the second band antenna 142 is 2.4 GHz. The VSWR of the antenna structure 100 corresponding to each frequency is shown in FIG. 4.

More particularly, the first band antenna 141 includes a first segment 1411, a second segment 1412, a third segment 1413, a fourth segment 1414, and a fifth segment 1415. The first segment 1411 is disposed along a first direction z, and one end of the first segment 1411 is electrically connected to the inductive element 150. The second segment 1412 is connected to the another end of the first segment 1411 and disposed along a second direction y perpendicular to the first segment 1411. The third segment 1413 is connected to the second segment 1412 and is parallel to the first segment 1411. The fourth segment 1414 is connected to the third segment 1413 and is parallel to the second segment 1412. The fourth segment 1414 is connected to the ground layer 120 through the fifth segment 1415.

The second band antenna 142 includes a first segment 1421, a second segment 1422, and a coupling segment 1423. The first segment 1421 is disposed along the first direction z. The second segment 1422 is connected to the first segment 1421 and disposed along the second direction y perpendicular to the first direction z. The coupling segment 1423 is connected to the first segment 1421 and the ground layer 120, and is parallel to the second segment 1422.

The feeding unit 130 includes a plumb segment 131, a horizontal segment 132, and a third segment 133. The plumb segment 131 is not connected to the ground layer 120. The horizontal segment 132 is connected to the plumb segment 131. A resonance frequency of the feeding unit 130 is 5 GHz. In particular, a feeding point F is used to receive a feeding signal.

When the frequency is high, the inductive element 150 is considered to be in an open circuit mode, where the feeding unit 130 is configured to generate resonance in the 5 GHz frequency band whilst the coupling segment 1423 acts as impedance matching in the 5 GHz frequency band, and the second band antenna 142 is configured to generate resonance in the 2.4 GHz frequency band. When the frequency is low, the inductive element 150 is considered to be in a short circuit mode, where the inductive element 150 and the first band antenna 141 are electrically connected to form a loop structure that generates resonance in the 1.7 GHz frequency band.

Moreover, the antenna unit 140 can further include a patch structure 143. The patch structure 143 is electrically connected to the inductive element 150 and overlaps the inductive element 150 along the direction x. The inductive element 150 overlaps the end of the antenna unit 140 that is away from the ground layer 120. In specific, the end of the first band antenna 141 that is away from the ground layer 120 is overlapped by the inductive element 150. The overlap region of the patch structure 143 and the inductive element 150 and the overlap region of the third segment 133 of the feeding unit 130 and the inductive element 150 act respectively as impedance matching in the 2.1 GHz frequency band and the 4 GHz frequency band. Therefore, by adjusting the location of the inductive element 150 and the size of the patch structure 143, the impedance matching in the 2.1 GHz and 4 GHz frequency bands can be adjusted.

More specifically, a length X1 of the first band antenna 141 along the second direction y is greater than or equal to a length X2 of the second band antenna 142 along the second direction y. There is a gap G1 between the second segment 1412 and the fourth segment 1414 along the first direction z, and the gap G1 is greater than or equal to 2.5 mm and less than or equal to 4.5 mm. The fourth segment 1414 is connected to the ground layer 120 through the fifth segment 1415, and a gap G2 between the fourth segment 1414 and the ground layer 120 along the first direction z is greater than or equal to 0.5 mm and less than or equal to 2 mm. The total length of the first band antenna 141 is greater than or equal to three quarters of the wavelength of the resonance frequency of the first band antenna 141 and less than or equal to the wavelength of the resonance frequency of the first band antenna 141. The fourth segment 1414 does not overlap the inductive element 150 along the direction x perpendicular to the first direction z and the second direction y. In particular, the total length of the first band antenna 141 is the sum of the lengths of all segments in the first band antenna 141, which is approximately two times the sum of the length X1 of the second segment 1412 and the length Y1 of the third segment 1413.

As for the second band antenna 142, the length X2 of the second segment 1422 is greater than a length Y3 of the first segment 1421. The sum of the length Y3 of the first segment 1421 and the length X2 of the second segment 1422 is approximately equal to one quarter of the wavelength of the resonance frequency of the second band antenna 142. There is a gap G3 between the coupling segment 1423 and the feeding unit 130 along the first direction z, and the gap G3 is greater than or equal to 0.5 mm and less than or equal to 2 mm. There is a gap G4 (shown in FIG. 1) between the second segment 1422 and the inductive element 150 along the first direction z, and the gap G4 is greater than or equal to 1.5 mm. Further, the gap G3 is used to adjust the impedance matching in 5 GHz to 6 GHz frequency band so as to improve efficiency and performance.

As shown in FIG. 4 and FIG. 5, the antenna structure 100 of the present disclosure maintains a good efficiency performance in the resonance frequency band covering from 1.7 GHz to 6 GHz.

Figure 6:
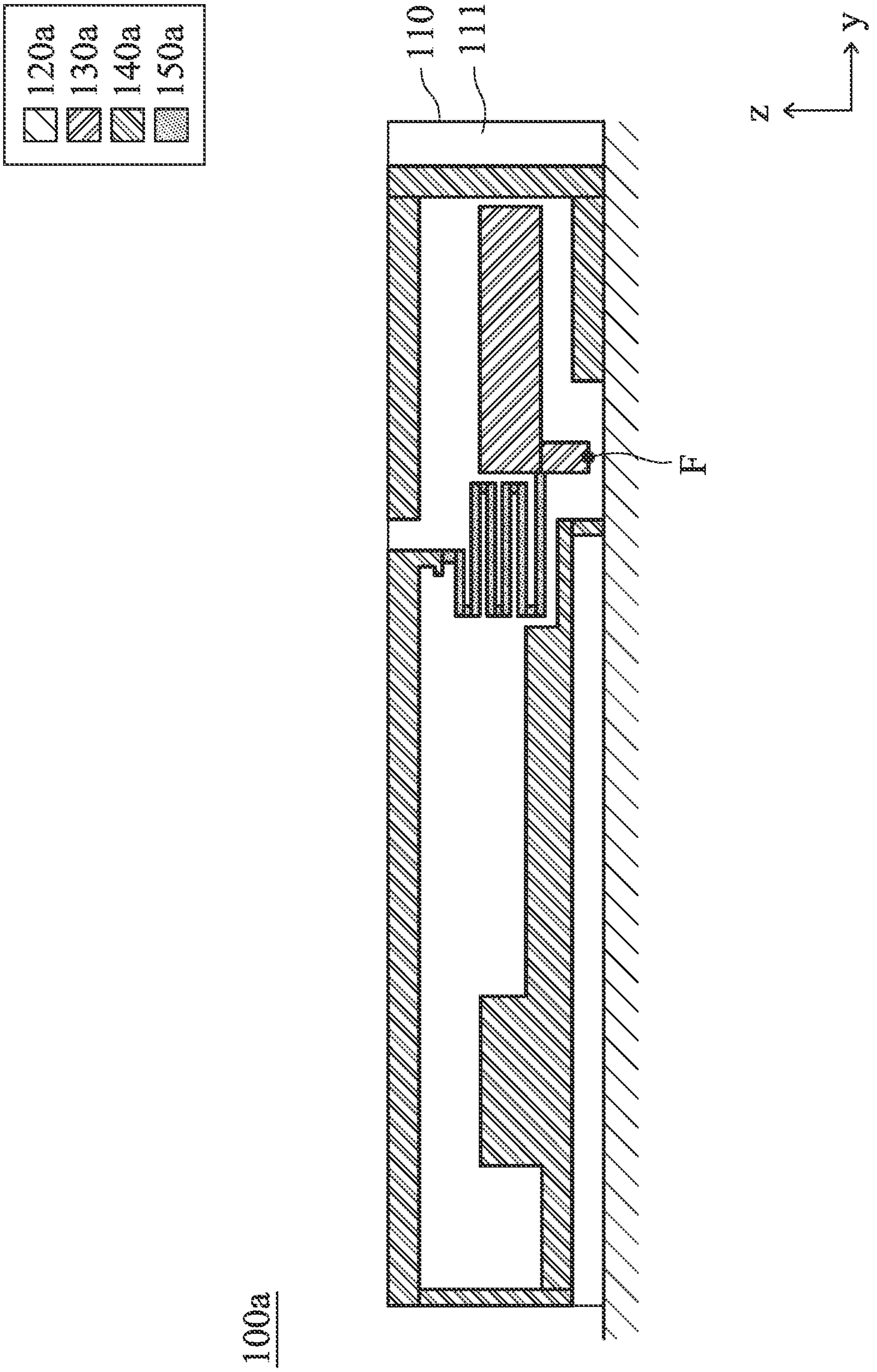
FIG. 6 is a schematic view of an antenna structure according to another embodiment of the present disclosure.

Referring to FIG. 1 and FIG. 6. FIG. 6 is a schematic view of an antenna structure 100*a* according to another embodiment of the present disclosure. The antenna structure 100*a* includes a substrate 110, a ground layer 120*a*, a feeding unit 130*a*, an antenna unit 140*a*, and an inductive element 150*a*. In this embodiment, the substrate 110, the ground layer 120*a*, the feeding unit 130*a*, and the antenna unit 140*a* of the antenna structure 100*a* are structurally similar to the substrate 110, the ground layer 120, the feeding unit 130, and the antenna unit 140 of the antenna structure 100 shown in FIG. 1, and therefore will not be described herein. More particularly, the ground layer 120*a*, the feeding unit 130*a*, the antenna unit 140*a*, and the inductive element 150*a* of this embodiment are all disposed on the first surface 111 in this embodiment. The inductive element 150*a* and the antenna unit 140*a* do not overlap along the direction x perpendicular to the first surface 111. Thus, the antenna structure 100*a* of the present disclosure is able to increase the range of the resonance frequency band without expanding in size.

In view of the above, the present disclosure has the following advantages. First, the size of the antenna structure of the present disclosure is reduced by disposing the ground layer, the feeding unit, the antenna unit, and the inductive element on the first surface and the second surface of the substrate, respectively, and using the via holes as electrical connections to efficiently save on the space. Second, the size of the antenna structure is minimized and the circuit components are simplified by replacing the thicker and more complex physical inductor with coil as the inductive element that connects the antenna unit and the feeding unit. Third, the antenna structure of the present disclosure maintains good efficiency performance in the resonance frequency covering from 1.7 GHz to 6 GHz. Fourth, the resonance frequency band range of the antenna structure of the present disclosure is increased without having to expand the size of the antenna structure.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An antenna structure comprising:
- a substrate;
- a ground layer disposed on the substrate;
- a feeding unit disposed on the substrate;
- an antenna unit disposed on the substrate and connected to the ground layer, wherein the feeding unit and the antenna unit are indirectly connected; and
- an inductive element, wherein one end of the inductive element is electrically connected to the feeding unit, and another end of the inductive element is electrically connected to the antenna unit;
- wherein the antenna unit comprises:
  - a first band antenna electrically connected to the another end of the inductive element; and
  - a second band antenna, wherein the second band antenna and the first band antenna are respectively disposed at two sides of the feeding unit;
- wherein the first band antenna comprises:
  - a first segment disposed along a first direction, wherein one end of the first segment is electrically connected to the inductive element;
  - a second segment connected to another end of the first segment and disposed along a second direction perpendicular to the first segment;
  - a third segment connected to the second segment and parallel to the first segment; and
  - a fourth segment connected to the third segment and parallel to the second segment;
- wherein there is a gap between the second segment and the fourth segment along the first direction, and the gap is greater than or equal to 2.5 mm and less than or equal to 4.5 mm.

2. The antenna structure according to claim 1, wherein the inductive element is a coil.

3. The antenna structure according to claim 1, wherein an equivalent inductance of the inductive element is greater than or equal to 4.2 nH and less than or equal to 8 nH.

4. The antenna structure according to claim 1,
- wherein a resonance frequency of the first band antenna is 1.7 GHz, and a resonance frequency of the second band antenna is 2.4 GHz.

5. The antenna structure according to claim 4, wherein a length of the first band antenna along the second direction is greater than or equal to a length of the second band antenna along the second direction.

6. The antenna structure according to claim 4, wherein the first band antenna further comprises a fifth segment, the fourth segment is connected to the ground layer through the fifth segment, there is a gap between the fourth segment and the ground layer along the first direction, and the gap is greater than or equal to 0.5 mm and less than or equal to 2 mm.

7. The antenna structure according to claim 5, wherein a total length of the first band antenna is greater than or equal to three quarters of a wavelength of the resonance frequency of the first band antenna and less than or equal to the wavelength of the resonance frequency of the first band antenna.

8. The antenna structure according to claim 5, wherein the fourth segment and the inductive element do not overlap along a direction perpendicular to the first direction and the second direction.

9. The antenna structure according to claim 1,
- wherein a resonance frequency of the first band antenna is 1.7 GHZ, and a resonance frequency of the second band antenna is 2.4 GHz;
- wherein the second band antenna comprises:
  - a first segment disposed along the first direction;
  - a second segment connected to the first segment and disposed along the second direction perpendicular to the first direction; and
  - a coupling segment connected to the first segment and the ground layer and parallel to the second segment.

10. The antenna structure according to claim 9, wherein a length of the second segment of the second band antenna is greater than a length of the first segment of the second band antenna, and a sum of the length of the first segment of the second band antenna and the length of the second segment of the second band antenna is equal to one quarter of a wavelength of the resonance frequency of the second band antenna.

11. The antenna structure according to claim 9, wherein there is a gap between the coupling segment and the feeding unit along the first direction, and the gap is greater than or equal to 0.5 mm and less than or equal to 2 mm.

12. The antenna structure according to claim 9, wherein there is a gap between the second segment and the inductive element along the first direction, and the gap is greater than or equal to 1.5 mm.

13. The antenna structure according to claim 1, wherein the substrate comprises:

a first surface, wherein the feeding unit, the antenna unit, the inductive element, and the ground layer are disposed on the first surface;

wherein the inductive element and the antenna unit do not overlap along a direction perpendicular to the first surface.

14. The antenna structure according to claim 1, wherein the feeding unit comprises:

a plumb segment; and a horizontal segment connected to the plumb segment;

wherein a resonance frequency of the feeding unit is 5 GHz.

15. An antenna structure comprising:

a substrate;

a ground layer disposed on the substrate;

a feeding unit disposed on the substrate;

an antenna unit disposed on the substrate and connected to the ground layer, wherein the feeding unit and the antenna unit are indirectly connected; and an inductive element, wherein one end of the inductive element is electrically connected to the feeding unit, and another end of the inductive element is electrically connected to the antenna unit, the inductive element is a coil;

wherein a coil width of the coil is greater than or equal to 0.2 mm and less than or equal to 0.5 mm, and a coil gap within the coil is greater than or equal to 0.2 mm and less than or equal to 0.5 mm.

16. An antenna structure comprising:

a substrate;

a ground layer disposed on the substrate;

a feeding unit disposed on the substrate;

an antenna unit disposed on the substrate and connected to the ground layer, wherein the feeding unit and the antenna unit are indirectly connected; and an inductive element, wherein one end of the inductive element is electrically connected to the feeding unit, and another end of the inductive element is electrically connected to the antenna unit;

wherein the substrate comprises:

a first surface, wherein the feeding unit, the antenna unit, and the ground layer are disposed on the first surface;

a second surface opposite the first surface, wherein the inductive element is disposed on the second surface; and two via holes penetrating through the substrate along a direction perpendicular to the first surface and the second surface, wherein one of the two via holes electrically connects the end of the inductive element and the feeding unit, and another one of the two via holes electrically connects the another end of the inductive element and the antenna unit.

17. The antenna structure according to claim 16, wherein the antenna unit comprises:

a patch structure electrically connected to the inductive element and overlapping the inductive element along the direction.

18. The antenna structure according to claim 17, wherein the antenna unit is overlapped at an end away from the ground layer by the inductive element.

* * * * *